(12) United States Patent
Burns et al.

(10) Patent No.: US 6,683,910 B1
(45) Date of Patent: Jan. 27, 2004

(54) VIDEO DATA COMPRESSION

(75) Inventors: James Edward Burns, Hants (GB); Timothy Stuart Roberts, Hook (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 467 days.

(21) Appl. No.: 09/597,880

(22) Filed: Jun. 20, 2000

(30) Foreign Application Priority Data

Jun. 21, 1999 (GB) .............................. 9914478

(51) Int. Cl.$^7$ .......................... H04N 7/12; H04N 11/02; H04N 11/04
(52) U.S. Cl. .................................. 375/240.24
(58) Field of Search ....................... 374/240.02, 240.03, 374/240.1, 240.18, 240.19, 240.22, 240.24, 240.27; 348/419.1, 404.1; H04N 7/12, 11/02, 11/04

(56) References Cited

U.S. PATENT DOCUMENTS

| | | | |
|---|---|---|---|
| 5,604,602 A | | 2/1997 | Guillotel et al. |
| 5,742,704 A | * | 4/1998 | Suzuki et al. ............... 382/176 |
| 5,835,673 A | * | 11/1998 | Yamada et al. ............. 386/112 |
| 5,845,041 A | * | 12/1998 | Ohkuma et al. ............... 386/68 |
| 6,072,830 A | * | 6/2000 | Proctor et al. .......... 375/240.22 |
| 6,084,636 A | * | 7/2000 | Sugahara et al. ....... 375/240.03 |
| 6,144,763 A | * | 11/2000 | Ito .............................. 382/166 |
| 6,233,008 B1 | * | 5/2001 | Chun .......................... 348/170 |

FOREIGN PATENT DOCUMENTS

| | | |
|---|---|---|
| EP | 0 576 763 | 1/1994 |
| EP | 0 720 375 | 7/1996 |
| EP | 0 720 376 | 7/1996 |
| GB | 2 335 560 | 9/1999 |
| GB | 2 335 815 | 9/1999 |

OTHER PUBLICATIONS

Patent Abstract of Germany DE4308263.

* cited by examiner

*Primary Examiner*—Nhon Diep
(74) *Attorney, Agent, or Firm*—Frommer Lawrence & Haug LLP; William S. Frommer; Dennis M. Smid

(57) ABSTRACT

Video data compression apparatus for compressing images of an input video signal on a block-by-block basis comprises a block analyser for analysing each block of an image to be compressed to detect a degree of difference between pixels within that block; a data quantity allocator for allocating target output data quantities for the compression of each block, the target data quantities being dependent on the detected degrees of pixel difference of the blocks; and a data compression encoder for compressing each block in accordance with the target output data quantity associated with that block.

14 Claims, 3 Drawing Sheets

VIDEO DATA COMPRESSION

BACKGROUND OF THE INVENTION

1. Field of the Invention

This invention relates to video data compression.

2. Description of the Prior Art

It has long been recognised that some video data compression systems, such as systems broadly defined by the MPEG-2 standard, use compression techniques in which the number of compressed data bits generated for a picture, or a part of a picture, depends on the nature of the image represented by that picture. Also, the main compression parameter which can be altered from block to block or picture to picture to change the bit rate, namely the degree of quantisation, has a somewhat non-linear and difficult to predict effect on the resulting bit rate.

These characteristics are of particular concern in systems such as video tape recorders, where there is generally a fixed allocation of bits for each picture or group of pictures (GOP) and little or no scope for exceeding that fixed allocation. As a result, techniques for bit rate control in video data compression are very important.

The so-called "Test Model 5" of the MPEG 2 system proposes a rate control algorithm that allocates bits between pictures in accordance with a "global complexity estimation" dependent upon the actual number of bits generated in respect of a preceding picture and the quantisation parameters used to achieve this. The actual bit rate achieved during compression of a picture is then monitored and the degree of quantisation varied during compression to try to achieve the desired total bit rate for that picture. This system can, however, be slow to react to changes in image type during the compression of a picture and cannot predict the presence of difficult-to-encode image portions (requiring a higher bit rate) towards the end of a particular picture.

GB-A-2 306 831 proposes various techniques for pre-coding or rehearsing the data compression of some or all of a GOP in order to arrive at a quantisation scheme for the GOP which will avoid exceeding the allocated bit rate. However, in modern systems fabricated using ASICs (application specific integrated circuits), the processing overhead of providing two or more encoders, or of running a single encoder at a multiple speed to carry out the rehearsal encoding followed by the final encoding, can be too great or too expensive for current ASIC design techniques.

SUMMARY OF THE INVENTION

This invention provides a video data compression apparatus for compressing images of an input video signal on a block-by-block basis, the apparatus comprising:

a block analyser for analysing each block of an image to be compressed to detect a degree of difference between pixels within that block;

a data quantity allocator for allocating target output data quantities for the compression of each block, the target data quantities being dependent on the detected degrees of pixel difference of the blocks; and a data compression encoder for compressing each block in accordance with the target output data quantity associated with that block.

The invention addresses the above problems by providing a pre-allocation of data output quantity (bits) to blocks within an image on the basis of the detected degree of pixel difference within each block. Compression can then take place towards the targets set in this way, for example by using an adaptive encoder which varies its compression parameters during compression to achieve its target.

In other embodiments, an encoder using a rehearsal technique may be employed, and here it is noted that because of the overall pre-allocation between blocks it is not then necessary to rehearse the whole image. This can save dramatically on memory and delay in the apparatus.

Of course, the blocks need not be square and indeed need not be of the same sizes, although if different sized blocks are used then the block size can be used as an additional factor in the data quantity allocation.

Although a preferred embodiment is in the form of an II-VTR using intra (I) pictures only, the invention is equally applicable to systems using GOPs also including P pictures, B pictures or both.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
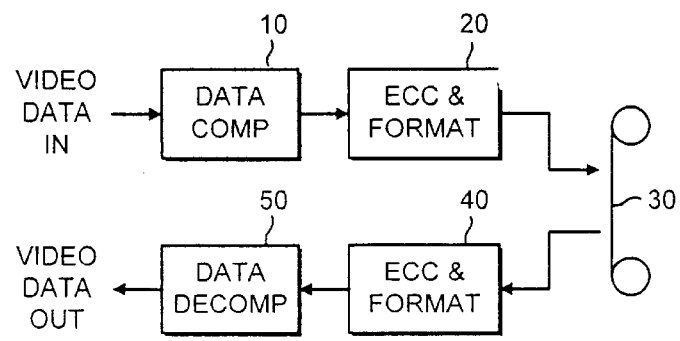
FIG. 1 is a schematic diagram of a video tape recorder (VTR) using data compression.

FIG. 1 is a schematic diagram of a video tape recorder (VTR) using data compression. Video data received by the VTR is supplied first to a data compression apparatus 10 in which the data quantity of the video data is reduced by compression techniques to be described below. The compressed video data is then passed to an error correcting code (ECC) processor and formatter which formats the data into an appropriate form for storage on tape and adds various error correcting codes in accordance with conventional techniques. The formatted data is then stored on a tape medium 30.

At replay, data is read from the tape medium 30 and processed by an ECC processor and formatter 40. This uses the ECC to detect any errors resulting from the data storage process and, hopefully, to correct them. It also re-formats the data into an appropriate form for decompression. Decompression is then carried out by a data decompression apparatus 50 which is arranged to provide a decompression process complimentary to the compression process applied by the data compression apparatus 10.

The key features of the embodiment which will be described below are found in the data compression apparatus 10. The remaining parts of FIG. 1 may be implemented using known techniques.

Figure 2:
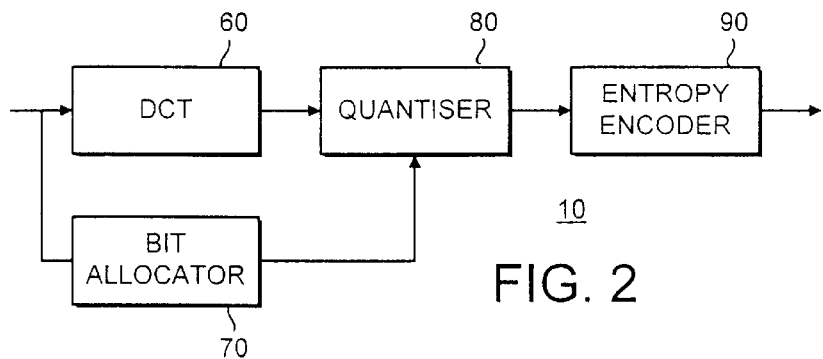
FIG. 2 is a schematic diagram of a data compression apparatus.

FIG. 2 is a schematic diagram of the data compression apparatus 10.

The VTR described in connection with this embodiment uses so-called "I" (intra) pictures only. So, unlike some implementations of systems such as MPEG-2, each picture (generally a frame) is compressed without reference to adjacent or nearby pictures. While this means that some of the compression efficiency which is possible with a long-GOP system using P pictures and B pictures cannot be achieved, it does mean that editing can easily take place at any desired frame boundary in the video signal. So, an I-frame VTR is particularly suited for studio use.

The fact that only I-frames are used means that the diagram shown in FIG. 2 is much simpler than a conventional long-GOP encoder.

So, FIG. 2 illustrates a DCT encoder 60, a bit allocator 70, a quantizer 80 and an entropy encoder 90. The DCT encoder 60 operates to decompose the picture into blocks of 8×8 pixels and to apply a discrete cosine transform to generate a corresponding matrix of 8×8 DCT coefficients representing increasing spatial frequency components.

In parallel with the DCT process, the bit allocator 70 examines the input images and allocates a proportion of the available number of bits for encoding each image (which is generally fixed quantity because of storage constraints imposed by the tape medium 30) to different areas of the image. In the present example, the allocation is carried out on a macroblock (MB) by macroblock basis. Here, the term macroblock refers to an array of 16×16 pixels, i.e. four DCT blocks. The specific operation of the bit allocator will be described in much more detail below, but as its output it supplies target data quantities for each macro to the quantizer 80.

The quantizer 80 carries out a conventional thresholding and quantization process which involves zeroing coefficients below a predetermined threshold and quantizing the remaining ones, with the degree of quantization being selected in order to control the resulting output data quantity and also to account (in a conventional way) for image attributes such as so-called image activity which can vary from area to area within the image.

Finally, the entropy encoder 90 carries out run length coding and variable length (Huffmann) coding so that more frequently occurring bit patterns within the run length encoded sequence are encoded to form shorter output data words.

Figure 3:
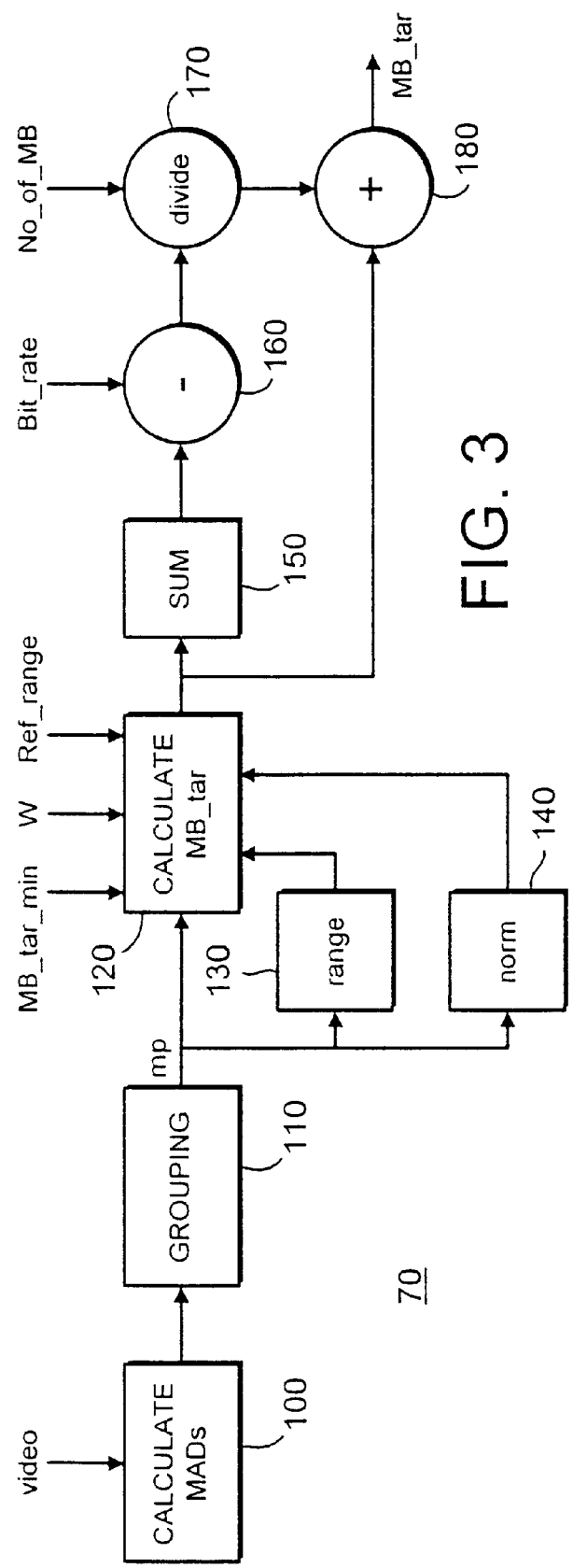
FIG. 3 is a schematic diagram of part of a bit allocator.

FIG. 3 is a schematic diagram of part of the bit allocator 70. The bit allocator comprises a MAD calculator 100, a grouping processor 110, a macroblock target calculator 120, a range detector 130, a normalizing processor 140, a summation processor 150, a subtracter 160, a divider 170 and an adder 180.

Figure 4:
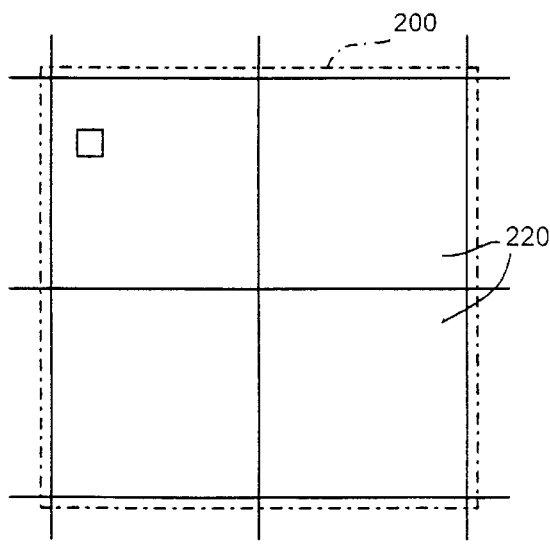
FIG. 4 schematically illustrates a macroblock.

The MAD calculator 100 operates on the input video data to calculate MAD (mean absolute difference) values macroblock-by-macroblock. FIG. 4 will be referred to during the explanation of this process. FIG. 4 schematically illustrates a macroblock 200 comprising an array of 16×16 pixels, i.e. a 2×2 array of DCT blocks 220. The MAD calculator 100 processes the pixel luminance values across the macroblock to generate a variable "MAD" in accordance with the following formula in equations (1) and (2):

$$\text{Intra\_MAD} = \sum_{i=0}^{MB} (|luminance_{pixel\,i} - \text{MB\_dc}|) \tag{1}$$

where $$\text{MB\_dc} = \frac{1}{256} \cdot \sum_{i=0}^{MB} (luminance_{pixel\,i} + 128) \tag{2}$$

An alternative formulation involves subtracting each pixel value from the average for that DCT block alone (rather than the average for the macroblock), according to the following equations (3) and (4):

$$\text{Intra\_MAD} = \sum_{i=0}^{MB} (|luminance_{pixel\,i} - \text{DCT\_dc}|) \tag{3}$$

where $$\text{MB\_dc} = \frac{1}{64} \cdot \sum_{i=0}^{DCT} (luminance_{pixel\,i}) \tag{4}$$

In other words, the variable MAD is an indication of the variation or differences of pixel values within the macroblock. A macroblock formed of generally similar pixel values will have a lower MAD value than a macroblock formed of generally differing pixel values.

As an alternative, pixel chrominance values, or luminance and chrominance values, could be used in the above calculations.

Returning to FIG. 3, the MAD values generated by the MAD calculator 100 can vary dramatically in numerical size. Although the MAD values could be used directly to control the target bit rate for the corresponding block, it has been found that much better results are obtained if the MAD values are first grouped together.

Accordingly, the MAD values are next grouped into certain ranges of MAD values by the grouping processor 110. This process will be described with reference to FIGS. 5 and 6 which are schematic histograms showing the distribution of MAD values within a picture.

Figure 5:
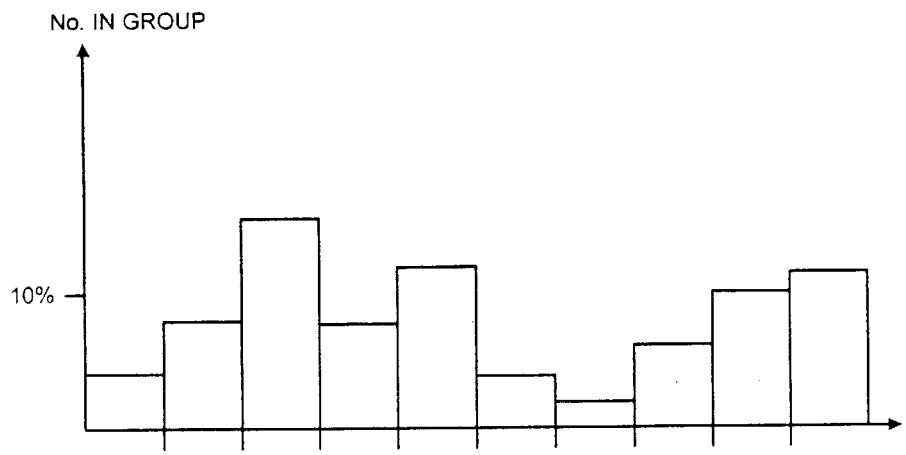
FIG. 5 is a schematic histogram showing the distribution of MAD values within a picture.

Referring to FIG. 5, the MAD values are initially arranged in ten evenly spaced ranges referred to as MAD groups or MAD_Grp. Here the groups are shown as being equally sized, in terms of the range of MAD values encompassed by each group, but they can be non-uniformly sized. In particular, it can be advantageous to employ smaller groups at the lower end of the MAD value scale, to give more resolution where more blocks are likely to be found.

Figure 6:
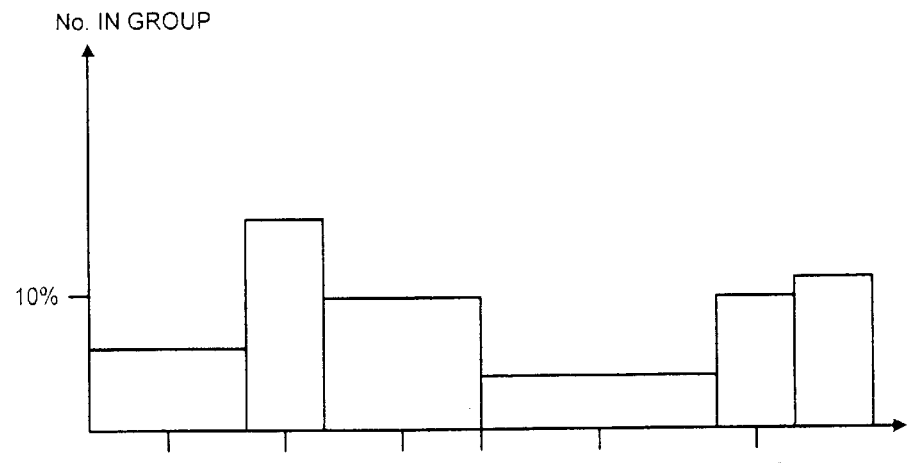
FIG. 6 is a schematic histogram showing the distribution of MAD values within a picture after a grouping process.

The MAD values are arranged into these groups across an entire picture. Depending on the image content of the picture, the distribution between the various groups of FIG. 5 can vary dramatically. The next step performed by the grouping processor 110 is to examine each group to detect whether it contains at least ten percent of the total number of macroblocks in the picture. Any group which does not contain ten percent is coalesced with the next group until a composite group is arrived at which contains at least the ten percent level. FIG. 6 schematically illustrates this process, and shows that the initial ten groups of FIG. 5 have been coalesced to form six new groups, with each of the new groups containing at least ten percent of the available macroblocks.

For each of the groups, the grouping processor 110 detects the mid-point (mp) of the MAD values within that group. Here, the mid-point is a representative value of the MAD values within a particular group and is defined as the mid-value of the range defined by that group, i.e. without regard to the actual distribution of MAD values within the group. However, in other embodiments the mid-point could be defined as, for example, the mean or median of the MAD values within a particular group.

Figure 7:
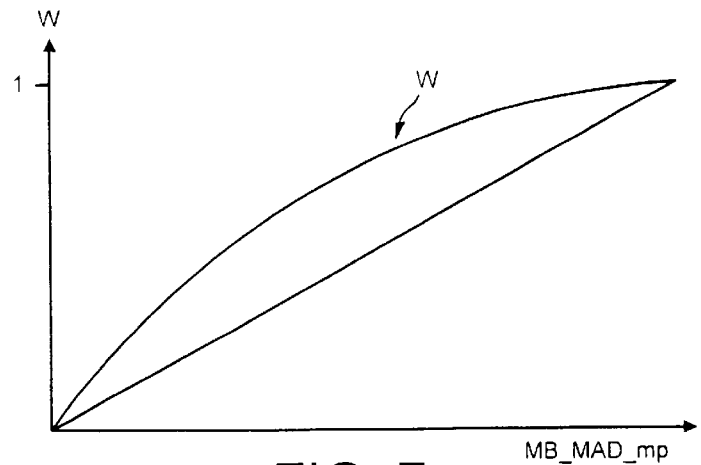
FIG. 7 schematically illustrates a weighting function.

The mid-points are passed to the target calculator 120, the range detector 130 and the normalizing processor 140. The normalizing processor 140 generates a normalizing function defined below. The range processor 130 generates a range function mp(9)–mp(0), i.e. defining the range between the mid-points of the lowest and highest MAD groups. The target calculator 120 also receives two further values: a weighting factor W shown schematically in FIG. 7 (the curved line) and a variable ref_range defining the desired range of bit rate targets for macroblocks, i.e. the maximum desired macroblock target minus the minimum macroblock target. The target calculator also receives the minimum macroblock target as an offset for use in the calculations described below.

From all of this input information, the target calculator 120 calculates the target bit rate for each macroblock in accordance with the equation (5):

$$\text{MB\_tar} = \text{norm} \cdot \frac{mp(x) - mp(0)}{mp(9) - mp(0)} \cdot W \cdot \text{ref\_range} + \text{MB\_tar\_min} \quad (5)$$

where:

mp(x)=mid point of group x and the normalising function, norm, is given by equation (6):

$$\text{norm} = \frac{1}{\sum_{x=grp0}^{x=grp9} (\text{No\_in\_grp} \cdot (mp(x) - mp(0)) \cdot W(\text{grp\_mp}))} \quad (6)$$

The target bit rates for each macroblock output by the target calculator 120 are summed by the summation processor 150 and then subtracted from the total available bit rate by the subtracter 160. Any excess bit rate is then divided (by the divider 170) by the total number of macroblocks to provide an equal share of the excess bit rate to each of the macroblocks. Similarly, if the bit allocations calculated by the target calculator are in excess of the available bit rate, the excess bit rate will in fact be a negative quantity. This additional bit rate is added to the target bit rate calculated by the target calculator 120 at the adder 180.

The MB are then compressed in accordance with the target bit rates allocated by the bit allocator.

The embodiment described above can be implemented using various types of encoders, such as an adaptive encoder or a rehearsal-type encoder, possibly arranged to rehearse only individual or small groups of MB to cut down on the delay and storage overhead of the apparatus.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Video data compression apparatus for compressing images of an input video signal on a block-by-block basis, said apparatus comprising:
   (i) a block analyser for analysing each block of an image to be compressed to detect a degree of difference between pixels within that block;
   (ii) a data quantity allocator for allocating target output data quantities for said compression of each block, said target data quantities being dependent on said detected degrees of pixel difference of the blocks; and
   (iii) a data compression encoder for compressing each block in accordance with said target output data quantity associated with that block.

2. Apparatus according to claim 1, comprising:
   (i) a grouping processor for arranging said degree of pixel difference values for blocks within an image into a predetermined set of groups each representing a respective range of pixel difference values;
   (ii) said data quantity allocator being operable to allocate a target output data quantity to a block in dependence on which group contains said degree of pixel difference derived from that block.

3. Video data compression apparatus for compressing images of an input video signal on a block-by-block basis, said apparatus comprising:
   (i) a block analyser for analysing each block of an image to be compressed to detect a degree of difference between pixels within that block;
   (ii) a grouping processor for arranging said degree of pixel difference values for blocks within an image into a predetermined set of groups each representing a respective range of pixel difference values; for detecting whether each group contains at least a predetermined number of blocks; and for combining a group not containing said predetermined number of blocks with a group representing an adjacent range of degrees of pixel difference values;
   (iii) a data quantity allocator for allocating target output data quantities for said compression of each block, said target data quantities being dependent on said detected degrees of pixel difference of the blocks; and
   (iv) a data compression encoder for compressing each block in accordance with said target output data quantity associated with that block,
   said data quantity allocator being operable to allocate a target output data quantity to a block in dependence on which group contains said degree of pixel difference derived from that block.

4. Apparatus according to claim 3, in which said predetermined number of blocks is substantially equal to said total number of blocks in an image divided by said initial number of groups.

5. Apparatus according to claim 2, in which said data quantity allocator is operable to allocate a target output data quantity to a block in dependence on a degree of pixel difference representative of said range of values comprising said group containing said degree of pixel difference for that block.

6. Apparatus according to claim 2, in which said data quantity allocator is operable to allocate a target output data quantity to a block according to a monotonically increasing relation to said median degree of pixel difference of said group containing the degree of pixel difference for that block, weighted so that blocks having low degrees of pixel difference are allocated proportionally higher output data quantities than blocks having high degrees of pixel difference.

7. Apparatus according to claim 2, said apparatus having a target total data quantity for an image, said data quantity allocator being operable to detect whether said sum of output data quantities for blocks of an image differs from said target total data quantity and, if so, to allocate an additive correction data quantity equally amongst the blocks.

8. Apparatus according to claim 2, in which said initial set of groups represent substantially equal ranges of values of degree of pixel difference.

9. Apparatus according to claim 1, in which said data compression encoder comprises:
   (i) a trial encoder for detecting data compression parameters required for each block in order to achieve said allocated output data quantity; and
   (ii) a final encoder for encoding each block in accordance with said respective data compression parameters detected by said trial encoder.

10. Apparatus according to claim 1, in which said degree of pixel difference is proportional to a sum of said absolute difference between each pixel value and a mean pixel value.

11. Video data storage apparatus comprising apparatus according to claim 1.

12. A method of video data compression apparatus in which images of an input video signal are compressed on a block-by-block basis, said method comprising said steps of:
   (i) analysing each block of an image to be compressed to detect a degree of difference between pixels within that block;
   (ii) allocating target output data quantities for said compression of each block, said target data quantities being dependent on said detected degrees of pixel difference of said blocks; and
   (iii) compressing each block in accordance with said target output data quantity associated with that block.

13. A computer program having program code means for performing said method according to claim 12.

14. A data carrier on which is stored a computer program according to claim 13.

* * * * *